Patented July 4, 1939

2,164,564

UNITED STATES PATENT OFFICE 2,164,564

CORROSION INHIBITOR

Edgar C. Britton, Howard S. Nutting, and Peter S. Petrie, Midland, Mich., assignors to The Dow Chemical Company, Midland, Mich., a corporation of Michigan No Drawing. Application May 3, 1937,
Serial No. 140,456

9 Claims. (Cl. 252—5)

The present invention relates to a corrosion inhibitor suitable for use with water and aqueous solutions of non-electrolytes in contact with metals. It also pertains to liquids comprising such inhibitor.

The corrosive effect of water and aqueous solutions of non-electrolytes upon metals, particularly iron and steel, due to the presence of dissolved oxygen, traces of electrolytes, etc., is well known. An object of the present invention is to provide an inhibitor which when added in small proportion to water or aqueous solutions of non-electrolytes will largely prevent the corrosion of metals, particularly iron and steel, by such solutions.

We have now discovered that if a small proportion of piperazine or an alkyl derivative thereof is added to water or an aqueous solution of a non-electrolyte, such solution when in contact with a metal even over a long period of time remains clear and free of particles, and the metal remains bright and unattacked.

Examples of the alkyl piperazine derivatives which are effective inhibitors are: methyl piperazine, tetramethyl piperazine, di-isopropyl piperazine, etc. The piperazine and piperazine derivatives herein referred to may be in anhydrous or hydrated form.

Among the fluids with which our new inhibitor is effective are water and aqueous solutions containing at least one alcohol. The term "alcohol" as herein employed refers to both monohydric and polyhydric alcohols: e. g. methanol, ethanol, isopropanol, ethylene glycol, propylene glycol, and glycerol. Such solutions are commonly used in fluid-pressure transmission systems, as heat-transfer liquids in automobile cooling systems, etc.

To prepare non-corrosive fluids in accordance with the invention a small proportion, e. g. 0.02–2.0 per cent by weight, preferably 0.2–1.5 per cent, of at least one compound selected from the group consisting of piperazine and alkyl-substituted piperazines is added to water or an aqueous solution of a non-electrolyte, e. g. methanol, ethanol, ethylene glycol, glycerol, etc. Similarly, the inhibitor may first be dissolved in the non-electrolyte, and water thereafter added. If desired, various other substances, e. g. oils, dyes, caustic soda, etc., may also be added to the solution, or our inhibitor may initially be mixed with such other substances, and the mixture thereafter be added to the water or aqueous solutions to be inhibited.

The following examples, which are not to be construed as limiting the invention, are given to demonstrate the non-corrosiveness of certain aqueous liquids inhibited in accordance with the invention as compared to similar liquids omitting the inhibitor.

Example 1

Samples of a 50 per cent by weight aqueous solution of ethylene glycol containing various proportions of tetramethyl piperazine were tested for corrosive action on iron as follows: A 200 cc. portion of such solution was placed in a flask and a weighed metal specimen (1.5" x 1.0" x 0.25") cut from an engine block was added. The flask and contents were maintained at a temperature of 80°–90° C. under a reflux condenser for a period of one week, during which time a stream of air was bubbled continuously through the hot liquid. The solution and metal specimen were then examined, and the latter was removed and weighed. From the loss in weight and known area of the specimen the rate of corrosion of the metal, expressed as inches penetration per year, was calculated. The following table summarizes the tests with tetramethyl piperazine, and gives the per cent by weight of tetramethyl piperazine in each solution subjected to such test, and the results of the tests:

| Concentration of tetramethyl piperazine | Appearance at end of test | | Corrosion rate inches per year |
|---|---|---|---|
| | Solution | Sample | |
| Per cent | | | |
| No inhibitor | Rusty | Corroded | .0088 |
| 0.27 | Cloudy | Slightly discolored; no rust. | .0034 |
| 0.78 | Clear | ...do... | .0010 |
| 1.42 | Clear | Bright; unchanged | .0001 |

Example 2

Two specimens of iron cut from an engine block were placed in separate flasks. One was covered with a 50 per cent by weight solution of ethylene glycol, and the other with a 50 per cent glycol solution to which 0.50 per cent by weight of piperazine hydrate had been added. The solutions were then maintained under reflux at a temperature of 80°–90° C., and air was bubbled continuously into the hot liquids. At the end of one day the specimen in the uninhibited glycol solutions was badly corroded and the solution was full of rust particles. However, even after nine days' test the specimen in the inhibited glycol solution was bright and substantially unattacked, and the solution was as clear as at the beginning of the test.

Under the severe test conditions employed in the foregoing examples the rate of corrosion of the metal was many times greater than it would be during usual employment of such fluids, as for instance, in an automobile radiator.

Other modes of applying the principle of our invention may be employed, change being made as regards the ingredients herein stated, provided the ingredients stated by any of the following claims or the equivalent of such stated ingredients be employed.

We therefore particularly point out and distinctly claim as our invention:

1. A fluid-pressure transmission and heat-exchange medium comprising a liquid selected from the group consisting of water and alcohols and a compound selected from the group consisting of piperazine and alkyl-substituted piperazines.

2. A fluid-pressure transmission and heat-exchange medium comprising an alcohol and a compound selected from the group consisting of piperazine and alkyl-substituted piperazines.

3. A fluid-pressure transmission and heat-exchange medium comprising water and a compound selected from the group consisting of piperazine and alkyl-substituted piperazines.

4. A fluid-pressure transmission and heat-exchange medium comprising water, an alcohol, and a compound selected from the group consisting of piperazine and alkyl-substituted piperazines.

5. A fluid-pressure transmission and heat-exchange medium comprising water, ethylene glycol, and a compound selected from the group consisting of piperazine and alkyl-substituted piperazines.

6. A fluid-pressure transmission and heat-exchange medium comprising water, an alcohol, and piperazine.

7. A fluid-pressure transmission and heat-exchange medium comprising water, an alcohol, and tetramethyl piperazine.

8. The method of inhibiting the corrosion of metals by an aqueous fluid in contact therewith, which comprises adding to said fluid a compound selected from the group consisting of piperazine and alkyl-substituted piperazines.

9. A method of inhibiting the corrosion of metals by an aqueous alcoholic fluid in contact therewith, which comprises adding to said fluid a compound selected from the group consisting of piperazine and alkyl-substituted piperazines.

EDGAR C. BRITTON.
HOWARD S. NUTTING.
PETER S. PETRIE.